US008649750B2

(12) United States Patent
Greenberg et al.

(10) Patent No.: US 8,649,750 B2
(45) Date of Patent: Feb. 11, 2014

(54) TECHNIQUES FOR EFFICIENT CARRIER RECOVERY FOR PASSBAND COMMUNCIATION SYSTEMS

(75) Inventors: Maxim Greenberg, Haifa (IL); Menashe Soffer, Katzir (IL)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 12/241,981

(22) Filed: Sep. 30, 2008

(65) Prior Publication Data

US 2009/0233564 A1 Sep. 17, 2009

Related U.S. Application Data

(60) Provisional application No. 61/035,480, filed on Mar. 11, 2008.

(51) Int. Cl.
*H04B 17/00* (2006.01)

(52) U.S. Cl.
USPC ...................................... 455/226.1

(58) Field of Classification Search
USPC ...................................... 455/226.1
See application file for complete search history.

(56) References Cited

U.S. PATENT DOCUMENTS

| 5,282,227 A * | 1/1994 | Crawford ...................... 375/327 |
| 6,137,847 A * | 10/2000 | Stott et al. ...................... 375/344 |
| 6,628,926 B1 | 9/2003 | van de Beek et al. |
| 7,088,782 B2 | 8/2006 | Mody et al. |
| 7,133,479 B2 | 11/2006 | Lee |
| 7,302,016 B1 * | 11/2007 | Rice et al. ...................... 375/329 |
| 2008/0043882 A1 | 2/2008 | Zhang |

FOREIGN PATENT DOCUMENTS

| JP | 2004200939 | 7/2004 |
| JP | 2005191971 | 7/2005 |
| WO | 2009114592 A3 | 12/2009 |

OTHER PUBLICATIONS

Office Action received for Japanese Patent Patent Application No. 2010-548945, mailed Jun. 5, 2012, 9 pgs. including 5 pgs. English translation.

\* cited by examiner

*Primary Examiner* — Yuwen Pan
*Assistant Examiner* — Fatuma Sherif
(74) *Attorney, Agent, or Firm* — Kacvinsky Daisak PLLC

(57) ABSTRACT

A method, apparatus, and article containing computer instructions are described. In an embodiment an apparatus includes a radio-frequency receiver to receive a training packet. The receiver may include a processor. The processor may include modules for performing carrier recovery. A coarse estimator module may derive a coarse frequency offset from the training packet; and a fine estimator module may derive a fine frequency offset from the training packet substantially simultaneously and in parallel with the coarse estimator module. A carrier recovery module may perform carrier recovery using the fine and coarse frequency offsets.

6 Claims, 3 Drawing Sheets

TECHNIQUES FOR EFFICIENT CARRIER RECOVERY FOR PASSBAND COMMUNCIATION SYSTEMS

CROSS-REFERENCE TO RELATED APPLICATIONS

This application is a non-provisional of, and claims priority to, U.S. Provisional Application 60/035,480, filed Mar. 11, 2008, which is incorporated herein in its entirety.

BACKGROUND

In passband communication systems, the carrier frequency in the transmitter may be derived locally from a timing reference, such as a crystal oscillator. A carrier recovery system may be a circuit used to estimate and compensate for frequency and phase differences between a received signal's carrier wave and the receiver's local oscillator for the purpose of coherent demodulation.

In the transmitter of a communications carrier system, a carrier wave may be modulated by a baseband signal. At the receiver, the baseband information may be extracted from the incoming modulated waveform. Ideally, the carrier frequency oscillators of the transmitter and receiver would be perfectly matched in frequency and phase thereby permitting perfect coherent demodulation of the modulated baseband signal. However, transmitters and receivers rarely share the same carrier frequency oscillator. Communications receiver systems are usually independent of transmitting systems and contain their own oscillators with frequency and phase offsets and instabilities.

In order to perform coherent demodulation, the receiver may need to know the exact carrier frequency and phase of the transmitter. Generally, the carrier frequency in the receiver may be derived independently from the transmitter. The carrier frequencies generated in the transmitter and the receiver may differ up to a maximal offset defined by a system designer. Thus the exact carrier frequency may need to be derived from the signal received at the receiver, a process also referred to as carrier recovery.

In a conventional passband communication system, the carrier recovery may be performed in at least two stages, for example, coarse frequency estimation followed by fine frequency offset estimation. It is with respect to these and other considerations that the following improvements are made.

DETAILED DESCRIPTION

Various embodiments may include a technique for efficient carrier recovery. The technique may shorten the overall time required for carrier recovery and increase overall system throughput.

One technique for carrier recovery may be to use the autocorrelation of the received signal. The frequency error, or residual frequency offset, may be the difference in frequency between the transmitter and the receiver. The residual frequency may be described, in the time domain, as the transmitted signal multiplied by a phasor (plus a noise term):

$$r(k)=x(k)e^{j2\pi\Delta fkT}+n(k), \quad (1)$$

where $\Delta f$ may be a residual frequency offset and T a sample duration. By sending a periodic training sequence of length N and period P, i.e. $x(k+P)=x(k)$, one may calculate an autocorrelation by:

$$R(P) = \sum_{k=1}^{N-P} r(k)r*(k+P) = e^{-j2\pi\Delta fPT}\sum_{k=1}^{N-P}|x(k)|^2 + \sum_{k=1}^{N-P}n'(k), \quad (2)$$

where the modified noise n'(k) includes the contributions from noise/signal and noise/noise terms.

As the length of training sequence N increases, the second sum in equation (2) tends to zero (average value of the noise), and an improved signal-to-noise ratio (SNR) may be obtained. For a constant N, the choice of the period P may affect the resulting system performance. It may be shown that larger P improves the effective SNR for angle calculations, and thus a larger P may be beneficial for the system performance. On the other hand, in order to eliminate phase ambiguity, the maximal period P may need to satisfy $$-\pi < 2\pi\Delta fPT < \pi, \text{ i.e. } P < \left|\frac{1}{2\Delta fT}\right|.$$

Figure 1:
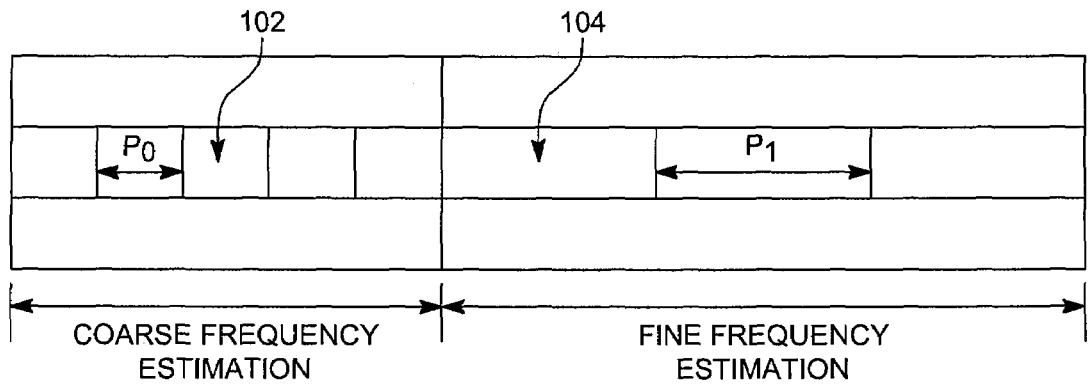
FIG. 1 illustrates a training sequence packet.

In a conventional passband communication system, the carrier recovery may be performed in at least two stages. FIG. 1 illustrates an example of a training sequence packet 100 for carrier recovery procedure in the conventional passband systems. In the first stage, a periodic signal 102 of length $N_0$ with a period $P_0$ may be used. The periodic signal may allow the frequency offset to be estimated with a precision $\Delta f_0$, i.e. the periodic signal yields the frequency offset estimation $\Delta \hat{f}=\Delta f+\Delta f_0$. The period $P_0$ may be chosen to be the largest period that prevents phase ambiguity, even for the maximum allowable frequency offset. This first stage may be referred to as "Coarse frequency estimation".

In the second stage, referred to as a "fine frequency offset estimation," a periodic signal 104 of length $N_1$ with a period $P_1$ may be used, which may allow the residual frequency offset $\Delta f_0$ to be estimated. $P_1$ may be chosen to be the largest period that prevents phase ambiguity for the maximum allowable residual frequency offset $\Delta f_0$.

Various embodiments may include a technique for more efficient carrier recovery. The technique may shorten the overall time required for carrier recovery by performing "Coarse" and "Fine" frequency estimations on the same sequence in parallel. The technique may also increase overall system throughput.

Figure 2:
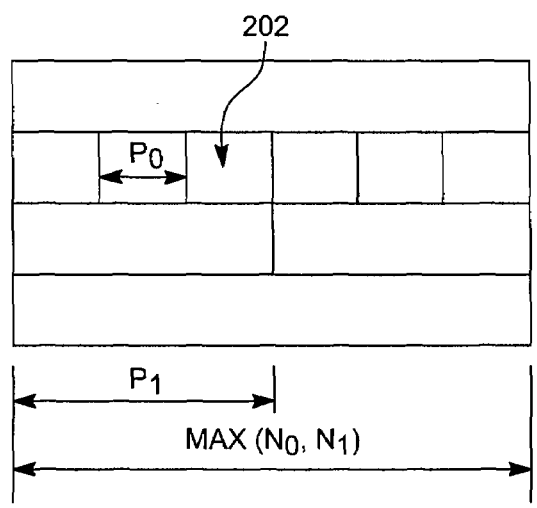
FIG. 2 illustrates a training sequence packet according to embodiments.

FIG. 2 illustrates an example of a training sequence packet 200 that may be used according to embodiments of the invention. Training sequence packet 200 may include a single periodic signal 202 of length $N_0$ with a period $P_0$. A second training sequence may not be needed. The size of period $P_1$ may be constrained, however, to be a multiple of $P_0$. The overall length of the training sequence may be set by $\max(N_0, N_1) < N_0+N_1$, where $N_0$ is the minimum length that allows estimation of the residual frequency offset $\Delta f_0$, and $N_1$ is the minimum length which allows the required precision in estimation of $\Delta f_0$. The structure of training sequence packet 200 may result in a packet length shorter than the training packets used in conventional systems. Shorter packets may result in greater throughput and/or faster carrier recovery.

Figure 3:
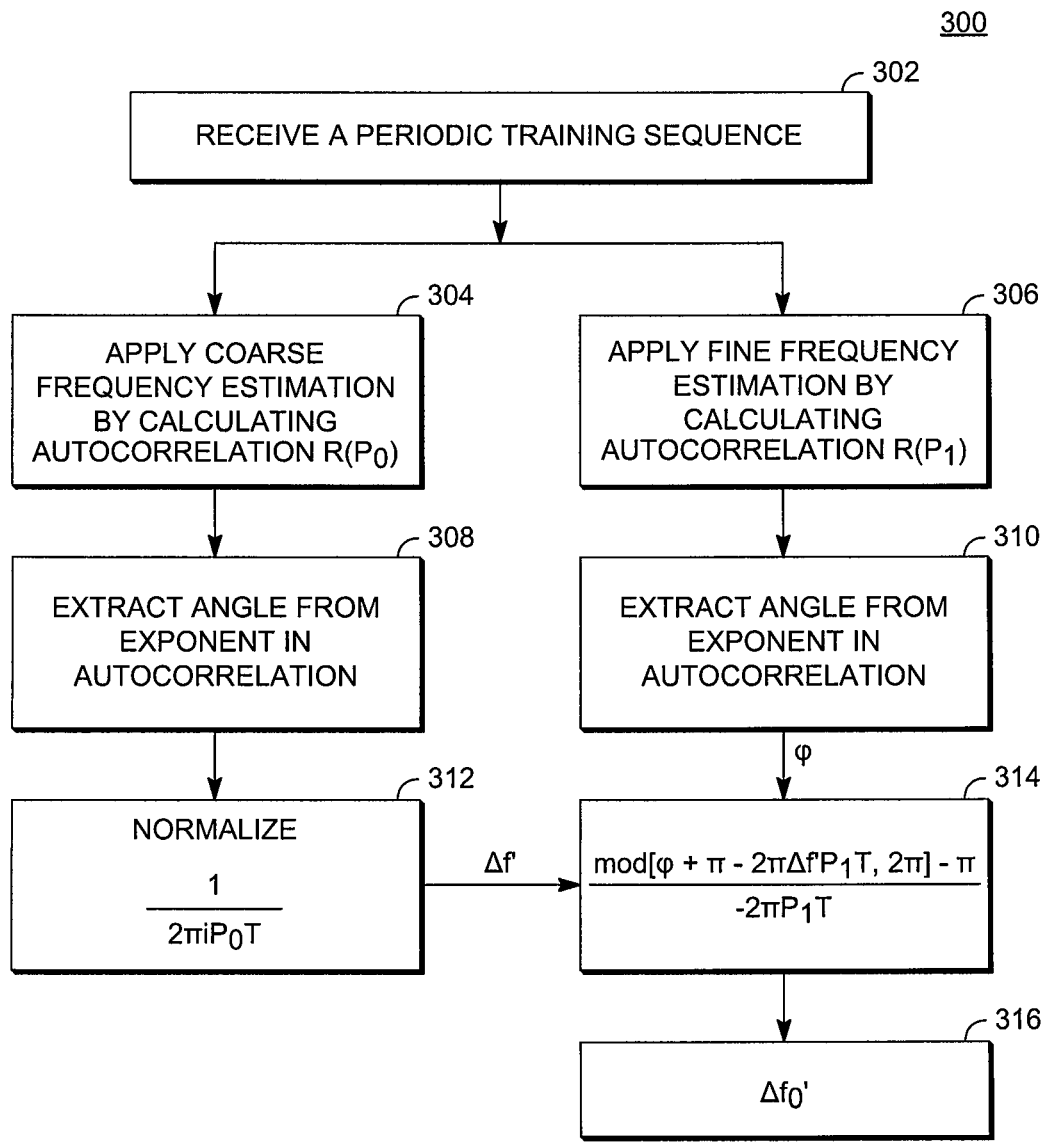
FIG. 3 illustrates logic flow diagram of a technique for carrier recovery according to embodiments.

A logical flow illustrating an embodiment of the technique is shown in FIG. 3. In block 302, the receiver may receive a periodic training sequence with the period $P_0$. The periodic training sequence may be similar to training sequence packet 200 described in FIG. 2.

In block 304, the receiver may apply a coarse frequency estimation to the training sequence. The coarse frequency estimation may be applied, for example, by calculating the autocorrelation $R(P_0)$, e.g. equation (2). The resulting frequency offset estimation $\Delta \hat{f} = \Delta f + \Delta f_0$ may have an estimation error $\Delta f_0$.

In block 306, the receiver may, in parallel and substantially simultaneously with block 304, apply fine frequency estimation by calculating the autocorrelation $R(P_1)$ of the same training sequence, where $P_1 = mP_0$ and m is an integer. Integer m may be the maximal integer that still prevents phase ambiguity for the maximum expected residual frequency offset $\Delta f_0$.

In block 308, the receiver may extract the angle from the exponent term in the autocorrelation $R(P_0)$, i.e., the $\Delta f$ term from $^{-j2\pi\Delta fPT}$.

In block 310, the receiver may, in parallel and substantially simultaneously with block 308, extract the angle from the exponent term in the autocorrelation $R(P_1)$. $R(P_1)$ may be proportional to $\exp\{-j2\pi\Delta fP_1T\}$ and its phase may be given by:

$$\phi = \mod [2\pi\Delta f P_1 T + \pi, 2\pi] - \pi \in [-\pi, \pi]. \quad (3)$$

In block 312, the extracted angle may be normalized, for example, by multiplying the angle by $1/(2\pi i P_0 T)$. The result after normalization may be the coarse frequency offset estimation $\Delta \hat{f}$. (Note that in FIG. 3, $\Delta \hat{f}$ is shown as: $\Delta f'$.)

In block 314, the extracted angle from block 310 and the coarse frequency offset may be applied to the equation shown in block 314.

By substituting $\Delta f = \Delta \hat{f} - \Delta f_0$ into equation (3), one may obtain:

$$\phi = \mod [2\pi(\Delta \hat{f} - \Delta f_0) P_1 T + \pi, 2\pi] - \pi = \mod [2\pi\Delta \hat{f} P_1 T - 2\pi\Delta f_0 P_1 T + \pi, 2\pi] - \pi. \quad (4)$$

In order to estimate $\Delta f_0$, one may solve a system of the form x+y=z mod $2\pi$, where x and z are known. If y satisfies y=y mod $2\pi$, the solution of the system is y=(z-x)mod $2\pi$.

In block 316, the receiver may obtain the residual offset frequency $\Delta \hat{f}_0$ (shown as $\Delta f_0'$). For example, by substituting $x=2\pi\Delta\hat{f}P_1T$, $y=-2\pi\Delta f_0 P_1 T + \pi$, $z=\phi+\pi$ into equation (4), one may obtain the estimate for the residual frequency offset $\Delta f_0$:

$$\Delta \hat{f}_0 = \frac{\mod [\phi + \pi - 2\pi\Delta\hat{f}P_1T, 2\pi] - \pi}{-2\pi P_1 T}. \quad (5)$$

Note that $\Delta \hat{f}_0$ may be accurate, but ambiguous, while $\Delta \hat{f}$ may be inaccurate, but able to resolve the ambiguity in $\Delta \hat{f}_0$. The resulting $\Delta \hat{f}_0$ may then be used to correct the frequency offset in the received signal.

In an embodiment, the overall length of the training sequence may be set by $N=\max(N_0, N_1) < N_0+N_1$, where $N_0$ is the minimum length at which the residual frequency offset $\Delta f_0$ may be obtained, and $N_1$ is the minimum length at which the required precision in estimation of $\Delta f_0$ may be obtained. (When $N_1 \to \infty$, $\Delta f_1 \to 0$, $\Delta \hat{f}_0 = \Delta f_0 + \Delta f_1$, where $\Delta f_1$ is the second stage error.)

Figure 4:
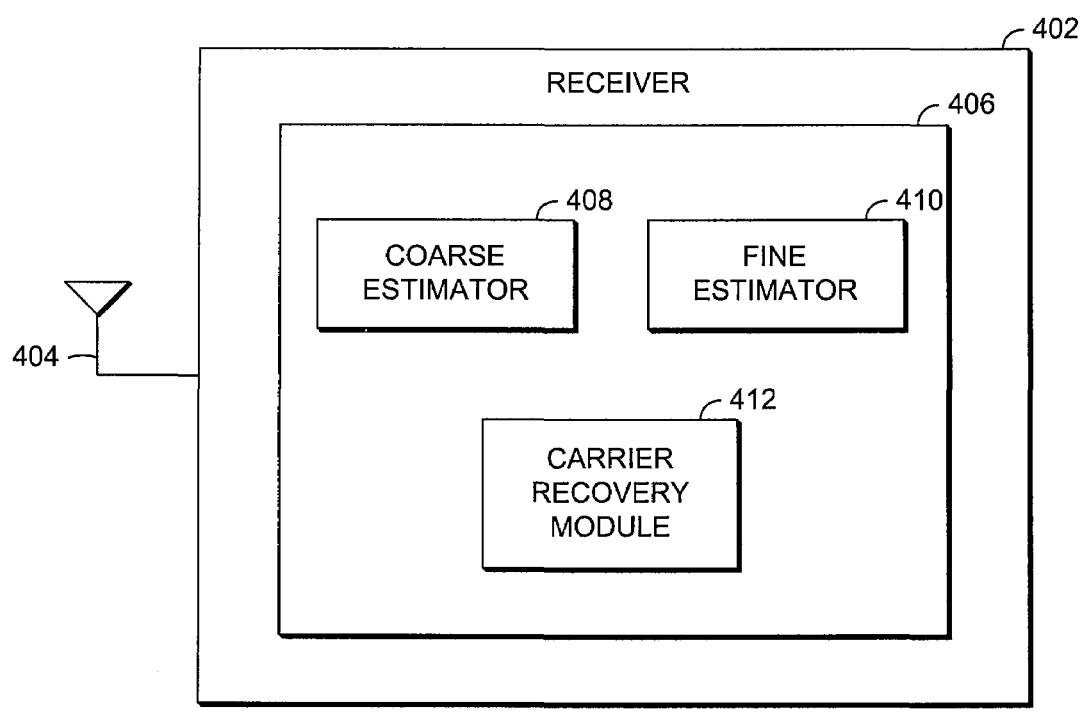
FIG. 4 illustrates a block diagram of an embodiment of an apparatus.

FIG. 4 illustrates a block diagram of a parallel two stage carrier recovery apparatus 400 according to an embodiment. Apparatus 400 may include a radio-frequency receiver 402. Receiver 402 may be capable of receiving a signal transmitted from a remote device. Receiver 402 may receive a signal via an antenna 404. Receiver 402 may further include a processor 406. Processor 406 may include various modules that may perform all or portions of techniques for frequency domain equalization. Such modules may include, for example, coarse estimator 408, fine estimator 410, and carrier recovery module 412.

In general, apparatus 400 may comprise various physical and/or logical components for communicating and manipulating information, which may be implemented as hardware components (e.g., computing devices, processors, logic devices), executable computer program instructions (e.g., firmware, software) to be executed by various hardware components, or any combination thereof, as desired for a given set of design parameters or performance constraints. Although FIG. 4 may show a limited number of components by way of example, it can be appreciated that a greater or a fewer number of components may be employed for a given implementation.

In various embodiments, the apparatus 400 may be implemented by a computing platform such as a mobile platform, personal computer (PC) platform, and/or consumer electronics (CE) platform supporting various networking, communications, and/or multimedia capabilities. Such capabilities may be supported by various networks, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless network in accordance with the described embodiments.

In some implementations, the apparatus 400 may comprise a system within and/or coupled to a computing device such as PC, desktop PC, notebook PC, laptop computer, mobile internet device (MID), mobile computing device, smart phone, personal digital assistant (PDA), mobile telephone, combination mobile telephone/PDA, video device, television (TV) device, digital TV (DTV) device, high-definition TV (HDTV) device, media player device, gaming device, or other type of computing device in accordance with the described embodiments.

A computing device comprising the apparatus 400 may form part of a wired communications system, a wireless communications system, or a combination of both. For example, the computing device may be arranged to communicate information over one or more types of wired communication links. Examples of a wired communication link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The computing device may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. In wireless implementations, the mobile computing device may comprise one more interfaces and/or components for wireless communication such as one or more transmitters, receivers, transceivers, amplifiers, filters, control logic, wireless network interface cards (WNICs), antennas, and so forth. Although certain embodiments may be illustrated using a particular communications media by way of example, it may be appreciated that the principles and techniques discussed herein may be implemented using various communication media and accompanying technology.

Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic) and/or combination thereof.

Returning to FIG. 4, coarse estimator 408 may perform the coarse estimation portion of the technique, e.g., blocks 304, 308, and 312. Fine estimator 410 may perform the fine estimation portion of the technique, e.g. blocks 306, 310, and 314. Coarse estimator 408 and fine estimator 410 may perform their respective functions substantially simultaneously and in parallel with each other.

Carrier recovery module 412 may use the coarse and fine estimates to calculate the frequency offset term and recover the baseband frequency. In an embodiment (not shown), coarse estimator 408 and/or fine estimator 410 may be a component of carrier recovery module 412.

In general, apparatus 400 may comprise various physical and/or logical components for communicating information, which may be implemented as hardware components (e.g., computing devices, processors, logic devices), executable computer program instructions (e.g., firmware, software) to be executed by various hardware components, or any combination thereof, as desired for a given set of design parameters or performance constraints. Although FIG. 4 may show a limited number of components by way of example, it can be appreciated that a greater or a fewer number of components may be employed for a given implementation.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated.

In various embodiments, the logic flow may comprise, or be implemented as, executable computer program instructions. The executable computer program instructions may be implemented by firmware, software, a module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computing device to perform a certain function. The executable computer program instructions may be implemented using any suitable programming language in accordance with the described embodiments. The executable computer program instructions may be provided for download from a server to a computing device such as those described above.

In various embodiments, logic flow may comprise, or be implemented as, executable computer program instructions stored in an article of manufacture and/or computer-readable storage medium implemented by various systems and/or devices in accordance with the described embodiments. The article and/or computer-readable storage medium may store executable computer program instructions that, when executed by a computing device, cause the computing device to perform methods and/or operations in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable media in accordance with the described embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within computing system registers and/or memories into other data similarly represented as physical quantities within the computing system memories, registers or other such information storage, transmission or display devices.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A method comprising:
   receiving a periodic training sequence having a period P;
   applying a coarse frequency estimation using the periodic training sequence by calculating a coarse autocorrelation of the periodic training sequence using the period P and estimating a coarse frequency offset based on the coarse autocorrelation;
   applying a fine frequency estimation, using the periodic training sequence, in parallel and substantially simultaneously with applying the coarse frequency estimation by calculating a fine autocorrelation of the periodic training sequence using a multiple of the period P, extracting an angle from an exponent term in the fine autocorrelation, and estimating a fine frequency offset based on the extracted angle and the coarse frequency offset; and
   obtaining a frequency offset correction term based on the coarse and fine frequency estimations,
   wherein the multiple of period P is the largest integer that prevents phase ambiguity for a maximum expected residual frequency offset, and
   wherein the periodic training sequence has a length N determined by the greater of a minimum length at which a residual frequency offset can be obtained ($N_0$) and a minimum length at which the required precision in estimation of the residual frequency offset may be obtained ($N_1$), where N is less than the sum of $N_0$ and $N_1$.

2. The method of claim 1, further comprising:
   performing carrier recovery using the frequency offset correction term.

3. An apparatus comprising:
   a radio-frequency receiver to receive a training packet comprising a plurality of substantially identical training sequences having a period P, the receiver comprising:
   a processor comprising:
   a coarse estimator module to derive a coarse frequency offset from the training packet by calculating a coarse autocorrelation using the period P and estimating a coarse frequency offset based on the coarse autocorrelation;
   a fine estimator module to derive a fine frequency offset from the training packet substantially simultaneously and in parallel with the coarse estimator module by calculating a fine autocorrelation using a multiple of period P, extracting an angle from an exponent term in the fine autocorrelation, and estimating a fine frequency offset based on the extracted angle and the coarse frequency offset; and
   a carrier recovery module to perform carrier recovery using the fine and coarse frequency offsets,
   wherein the multiple of period P is the largest integer that prevents phase ambiguity for a maximum expected residual frequency offset, and
   wherein the periodic training sequence has a length N determined by the greater of a minimum length at which a residual frequency offset can be obtained ($N_0$) and a minimum length at which the required precision in estimation of the residual frequency offset may be obtained ($N_1$), where N is less than the sum of $N_0$ and $N_1$.

4. The apparatus of claim 3, further comprising an antenna coupled to the receiver.

5. An article comprising a storage medium containing instructions that if executed enable a system to:
   receive a periodic training sequence having a period P;
   apply a coarse frequency estimation using the periodic training sequence by calculating a coarse autocorrelation of the periodic training sequence using the period P and estimating a coarse frequency offset based on the coarse autocorrelation;
   apply a fine frequency estimation, using the periodic training sequence, in parallel and substantially simultaneously with applying the coarse frequency estimation by calculating a fine autocorrelation of the periodic training sequence using a multiple of the period P, extracting an angle from an exponent term in the fine autocorrelation, and estimating a fine frequency offset based on the extracted angle and the coarse frequency offset; and
   obtain a frequency offset correction term based on the coarse and fine frequency estimations,
   wherein the multiple of period P is the largest integer that prevents phase ambiguity for a maximum expected residual frequency offset, and
   wherein the periodic training sequence has a length N determined by the greater of a minimum length at which a residual frequency offset can be obtained ($N_0$) and a minimum length at which the required precision in estimation of the residual frequency offset may be obtained ($N_1$), where N is less than the sum of $N_0$ and $N_1$.

6. The article of claim 5, further comprising instructions that enable the system to:
   perform carrier recovery using the frequency offset correction term.

* * * * *

UNITED STATES PATENT AND TRADEMARK OFFICE
CERTIFICATE OF CORRECTION

PATENT NO.         : 8,649,750 B2                              Page 1 of 1
APPLICATION NO.    : 12/241981
DATED              : February 11, 2014
INVENTOR(S)        : Maxim Greenberg et al.

It is certified that error appears in the above-identified patent and that said Letters Patent is hereby corrected as shown below:

On the title page, item (54), and in the specification, column 1, line 3, "Title", delete "COMMUNCIATION" and insert -- COMMUNICATION --, therefor.

On the title page, item (56), in column 2, under "Other Publications", line 1, delete "Patent Patent" and insert -- Patent --, therefor.

In the Specification

In column 1, line 9, delete "60/035,480" and insert -- 61/035,480 --, therefor.

Signed and Sealed this
Second Day of September, 2014

Michelle K. Lee
*Deputy Director of the United States Patent and Trademark Office*